United States Patent [19]

Rosen et al.

[11] Patent Number: 5,016,250

[45] Date of Patent: May 14, 1991

[54] X-RAY LASERS AND METHODS UTILIZING TWO COMPONENT DRIVING ILLUMINATION PROVIDED BY OPTICAL LASER MEANS OF RELATIVELY LOW ENERGY AND SMALL PHYSICAL SIZE

[75] Inventors: Mordecai D. Rosen, Berkeley; Dennis L. Matthews, El Granada, both of Calif.

[73] Assignee: The United States of America as represented by the United States Department of Energy, Washington, D.C.

[21] Appl. No.: 423,165

[22] Filed: Oct. 18, 1989

[51] Int. Cl.[5] .............................................. H01S 3/30
[52] U.S. Cl. ........................................ 372/5; 372/25; 372/102; 372/70; 372/72
[58] Field of Search ..................... 372/5, 70, 76, 102, 372/700, 84, 72, 25

[56] References Cited

U.S. PATENT DOCUMENTS

| | | | |
|---|---|---|---|
| 4,012,640 | 3/1977 | McKnight et al. | 250/493 |
| 4,589,113 | 5/1986 | Hagelstein | 372/5 |
| 4,592,056 | 5/1986 | Elton | 372/5 |
| 4,599,731 | 7/1986 | Ware et al. | 372/77 |
| 4,630,274 | 12/1986 | Schafer | 372/9 |
| 4,704,718 | 11/1987 | Suckewer | 372/5 |
| 4,731,786 | 3/1988 | MacGowan et al. | 372/70 |
| 4,766,597 | 8/1988 | Olshansky | 372/44 |
| 4,827,479 | 5/1989 | Campbell et al. | 372/5 |
| 4,870,648 | 9/1989 | Ceglio et al. | 372/103 |

OTHER PUBLICATIONS

Bor et al., Appl. Phys. B32, pp. 101 to 104 (1983).
Rosen et al., Physical Review Letters 54, pp. 106 to 109 (1985).
Matthews et al., Physical Review Letters 54, pp. 110 to 113 (1985).
Physics Today, Mar. 1985, pp. 17 to 19 (1985).
MacGowan et al., Physical Review Letters 59, pp. 2157 to 2160 (1987).
Eder et al., J. Opt. Soc. Am. B4, pp. 1949 to 1953 (1987).
Matthews et al., Scientific American, Dec. 1988, pp. 86 to 91 (1988).

Primary Examiner—Frank Gonzalez
Assistant Examiner—Susan S. Morse
Attorney, Agent, or Firm—Henry P. Sartorio; L. E. Carnahan; William R. Moser

[57] ABSTRACT

An X-ray laser (10), and related methodology, are disclosed wherein an X-ray laser target (12) is illuminated with a first pulse of optical laser radiation (14) of relatively long duration having scarcely enough energy to produce a narrow and linear cool plasma of uniform composition (38). A second, relatively short pulse of optical laser radiation (18) is uniformly swept across the length, from end to end, of the plasma (38), at about the speed of light, to consecutively illuminate continuously succeeding portions of the plasma (38) with optical laser radiation having scarcely enough energy to heat, ionize, and invert them into the continuously succeeding portions of an X-ray gain medium. This inventive double pulse technique results in a saving of more than two orders of magnitude in driving optical laser energy, when compared to the conventional single pulse approach.

15 Claims, 7 Drawing Sheets

X-RAY LASERS AND METHODS UTILIZING TWO COMPONENT DRIVING ILLUMINATION PROVIDED BY OPTICAL LASER MEANS OF RELATIVELY LOW ENERGY AND SMALL PHYSICAL SIZE

The U.S. Government has rights to this invention pursuant to Contract No. W-7405-ENG-48 between the U.S. Department of Energy and the University of California, for the operation of Lawrence Livermore National Laboratory.

BACKGROUND OF THE INVENTION

The invention described herein relates generally to X-ray lasers, and more particularly to improved means and methods for driving X-ray lasers.

The first operational conventional-laser-driven X-ray laser is taught by Campbell et al in U.S. Pat. No. 4,827,479 issued May 2, 1989. This X-ray laser was described by Rosen et al in Physical Review Letters 54, 106 (1985), and the experimental demonstration of the X-ray laser was set forth by Matthews et al in Physical Review Letters 54, 110 (1985), with news of the X-ray laser having been reported in Physics Today, March 1985, at pages 17 to 19. Other known X-ray lasers are described by MacGowan et al in Physical Review Letters 59, 2157 (1987), and by Eder et al in J. Opt. Soc. Am. B 4, 1949 (1987).

X-ray lasers are reviewed by Matthews and Rosen in their article "Soft-X-Ray Lasers", Scientific American, December 1988, at pages 86 to 91, incorporated by reference herein. At page 88, and following, the article states, ". . . to achieve a robust population inversion in soft-X-ray lasers one not only must supply 1,000 times as much energy as for an optical laser but also must supply it roughly 10,000 times as fast. To do this, high-power optical lasers are employed as pumps. At the LLNL (Lawrence Livermore National Laboratory) the pumps are two beams of the 10-beam NOVA, the world's most powerful laser . . . , which is capable of delivering up to $10^{14}$ watts in a pulse of less than a nanosecond. . . . In the X-ray lasers now operating at the LLNL, the NOVA beam strikes a thin foil of, say, selenium, yttrium or molybdenum . . . . In fact, when the NOVA beam strikes the foils, it vaporizes them completely and creates a plasma in which, for example, selenium atoms (with 34 electrons) are stripped of their outer 24 electrons. The electrons freed by the intense NOVA beam are of high energy - 1,000 electron volts (1 keV) or, equivalently, a temperature of 10 million degrees Kelvin. . . . At the LLNL the selenium foil is actually a layer about 75 nanometers thick, several millimeters wide and several centimeters long, which is deposited on a vinyl substrate to give it rigidity. Special lenses focus the NOVA beam to a line of about the same length but 0.1 millimeter wide. When such a line-focused light pulse from NOVA strikes the selenium target, the thin selenium foil is heated throughout, explodes and forms a cylindrically shaped plasma about 0.1 millimeter in diameter and several hundred times that in length. The cylindrical shape provides a preferred axis for X-ray amplification: photons traveling radially pass out of the plasma, whereas photons traveling along the axis stimulate the emission of other X-rays. Since there are no mirrors, the amplification takes place on only a single pass". The article goes on to observe that seemingly ". . . devices requiring the million-gigawatt NOVA as a pump can never be made small and practical".

In the operation, for example, of a conventional-laser-driven nickel-like X-ray laser, that amplifies X-rays having a wavelength of about 45 Angstroms, the driving optical laser must typically provide an incident irradiance to the active area of the X-ray laser foil of about at least $6 \times 10^{14}$ watts/cm$^2$, in a pulse having a duration of about 1.0 nanosecond. Since in large optical systems the minimum width to which an optical laser pulse can be line focused is about 100 microns, the optical pulse must contain about 9,000 joules of energy to drive an X-ray laser that is only about 1.5 centimeters long. Optical laser pulses with such a huge energy content can only be delivered by enormous, building-sized laser systems, such as the Lawrence Livermore National Laboratory NOVA. Consequently, except at the rare and unique facilities where these immense laser systems exist, as a practical matter the usage of X-ray lasers is everywhere foreclosed. This is indeed unfortunate because the potential use of X-ray lasers in submicroscopic imaging, holography, and spectroscopy cannot go forward on a practical and widespread basis so long as X-ray lasers cannot be driven by optical lasers of relatively low energy and small physical size, and so long as methods do not exist for driving X-ray lasers with optical lasers of relatively low energy and small physical size.

As an example of these observations, Suckewer, in U.S. Pat. No. 4,704,718 issued Nov. 3, 1987, discloses soft X-ray lasing action within a recombining plasma column contained and shaped by a strong cylindrical magnetic field created by powerful 100 to 150K Gauss helical solenoid magnets. The magnetically confined plasma column is created by focusing a high energy, 1.5 KJ, $CO_2$ laser pulse on a target such as carbon. Subsequently, a second powerful picosecond laser beam is focused along the central part of the plasma column, and a soft X-ray laser beam is stated to form in the recombining plasma of the magnetically confined plasma column. A 1.5 KJ, $CO_2$ laser pulse must be produced by precisely the sort of immensely vast laser apparatus that has just been referred to, and whose required use so effectively precludes the free and common availability of X-ray lasers.

SUMMARY OF THE INVENTION

It is, therefore, an object of the invention to provide an X-ray laser that is driven by an optical laser or lasers of relatively low energy and small physical size.

Another object of the invention is to provide a method of driving an X-ray laser with an optical laser or lasers of relatively low energy and small physical size.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, an X-ray laser is disclosed wherein X-ray radiation is amplified along a path disposed within an X-ray gain medium. The X-ray laser is comprised of a target comprised of a material from which the X-ray gain medium is to be produced. Means are provided for illuminating a narrow and linear portion of the target with a first quantity of optical laser radiation having scarcely enough energy to explode it and produce a narrow and linear cool plasma of uniform composition. This plasma must exist for a time at least as long as the time that it would take for light to travel its length. Means are further provided for uniformly sweeping a second quantity of optical laser radiation across the length of the plasma from end to end, at about the speed of light, to consecutively illuminate continuously succeeding portions of it with optical laser radiation having scarcely enough energy to heat, ionize, and invert the cool plasma, and thus provide continuously succeeding portions of the X-ray gain medium.

It is often preferred that the X-ray laser target be configured as a flat thin foil, with the first quantity of optical laser radiation being line focused on a narrow and linear portion of the foil In this case, the second quantity of optical laser radiation is diffracted from a diffraction grating to provide a diffracted beam of optical laser radiation. With the foil positioned with its surface normal at a tilt angle with respect to the direction of propagation of the diffracted optical laser beam, the beam is line focused on the narrow and linear cool plasma of uniform composition. With the incident angle of the second quantity of optical laser radiation on the diffraction grating being $\theta_1$, and the diffraction angle of the diffracted beam being $\theta_2$, the relationship $$\alpha = \tan^{-1}\left(\frac{\sin\theta_1 + \sin\theta_2}{\cos\theta_2}\right)$$

obtains, wherein $\alpha$ is the angle at which the beam front of the diffracted beam of optical laser radiation is inclined with respect to the perpendicular to the direction of propagation of that beam. With the tilt angle being $\beta$, the relationship $$\beta = \pi/2 - 2\alpha$$

obtains. It is noted that if $\beta$ equals zero, $\alpha$ is $\pi/4$, or 45 degrees, this situation being distinctly subsumed within this invention.

Preferably, the narrow and linear cool plasma of uniform composition has an electron density within the range extending from about $3 \times 10^{20}$ to $3 \times 10^{21}$ electrons per centimeter cubed, and an electron temperature within the range extending from about 20 to 100 eV. Preferably, the continuously succeeding portions of the X-ray gain medium are heated by the second quantity of optical laser radiation to a peak electron temperature within the range from about 1 to 2 KeV.

In a preferred embodiment of the X-ray laser of this invention, the flat thin foil is comprised of tungsten and is approximately 500 Angstroms thick. The first quantity of optical laser radiation is a temporally Gaussian shaped laser pulse having a full width at half maximum amplitude of about 1.0 nanosecond, a wavelength of about 0.53 microns, and an energy content of approximately 15 joules. The second quantity of optical laser radiation, before diffraction, is a temporally Gaussian shaped laser pulse having a full width at half maximum amplitude of about 20 picoseconds, a wavelength of about 0.53 microns, and an energy content of approximately 54 joules. The first quantity of optical laser radiation is focused to an area approximately 50 microns by 1.5 centimeters in extent on the tungsten foil, and the diffracted beam of optical laser radiation is line focused to an area approximately 30 microns by 1.5 centimeters, on the narrow and linear cool plasma of uniform composition.

It is sometimes preferred that the X-ray laser target of this invention be configured as a solid having a flat surface, with the first quantity of optical laser radiation being line focused on a narrow and linear portion of the flat surface of the target. In this case, as in that described in the preceeding paragraph, the second quantity of optical laser radiation is diffracted from a diffraction grating to provide a diffracted beam of optical laser radiation With the target positioned with its surface normal at a tilt angle with respect to the direction of propagation of the diffracted optical laser beam, the beam is line focused on the narrow and linear cool plasma of uniform composition. With the incident angle of the second quantity of optical laser radiation on the diffraction grating being $\theta_1$, and the diffraction angle of the diffracted beam being $\theta_2$, the relationship $$\alpha = \tan^{-1}\left(\frac{\sin\theta_1 + \sin\theta_2}{\cos\theta_2}\right)$$

obtains, wherein $\alpha$ is the angle at which the beam front of the diffracted beam of optical laser radiation is inclined with respect to the perpendicular to the direction of propagation of that beam. With the tilt angle being $\beta$, the relationship $$\beta = \pi/2 - 2\alpha$$

obtains. It is noted that if $\beta$ equals zero, $\alpha$ is $\pi/4$, or 45 degrees, this situation being distinctly subsumed within this invention.

In many situations it is preferred that the first quantity of optical laser radiation be comprised of a multiplicity of optical laser beams. In other situations it will be preferred that the second quantity of optical laser radiation be comprised of multiple optical laser beams. In yet other situations it will be preferred if both the first and the second quantitites of optical laser radiation be each comprised of a multiplicity of optical laser beams.

This invention also comprises a methodology for providing an X-ray gain medium that laser amplifies X-ray radiation along a path within the gain medium. The method comprises illuminating a narrow and linear portion of a target, comprised of a material from which the X-ray gain medium is to be produced, with a first quantity of optical laser radiation having scarcely enough energy to explode the portion and produce from it a narrow and linear cool plasma of uniform composition. This cool plasma must exist for at least as long as the time it takes for light to traverse its length. The method proceeds by uniformly sweeping a second quantity of optical laser radiation, at about the speed of light, across the length of the narrow and linear cool plasma, from end to end. In this manner, continuously succeeding portions of the cool plasma are consecutively illuminated with optical laser radiation having scarcely enough energy to heat, ionize, and invert them so that they are converted into continuously succeeding portions of the X-ray gain medium.

In the application of this inventive methodology, it is very often preferred that the target illuminated by the first quantity of optical laser radiation be either a flat thin foil or a solid body having a flat surface. In this situation, the second quantity of optical laser radiation is diffracted from a diffraction grating to provide a diffracted beam of optical laser radiation that is line focused on the narrow and linear cool plasma of uniform composition. When this is done, however, the surface normal of the illuminated surface of the foil or solid body must be positioned at a tilt angle, which may be zero, with respect to the direction of propagation of the diffracted beam of optical laser radiation. In accordance with this invention, if $\theta_1$ and $\theta_2$ are the angles of incidence and diffraction, respectively, of the second quantity of optical laser radiation upon the diffraction grating, $$\alpha = \tan^{-1}\left(\frac{\sin\theta_1 + \sin\theta_2}{\cos\theta_2}\right)$$

where $\alpha$ is the angle at which the beam front of the diffracted beam of optical laser radiation is inclined with respect to the perpendicular to the direction of propagation of that beam. If the tilt angle is denominated as $\beta$, $$\beta = \pi/2 - 2\alpha.$$

It is again emphasized that $\beta$ may be zero, in which case $\alpha$ is 45 degrees. However, in the more usual case $\beta$ will assume at least some slight, positive or negative, non-zero value. The actual values of $\theta_1$, $\theta_2$, $\alpha$, and $\beta$ will be determined by factors such as the line spacing of the diffraction grating, the spectral order of the diffracted beam of optical laser radiation, and the spatial geometry available to those seeking to implement this inventive methodology in actual practice.

It will thus be observed that the benefits and advantages of the present invention, as embodied and broadly described herein, include, inter alia, both X-ray lasers and a methodology for their operation, that each utilize low-energy driving optical laser means of relatively small physical size.

BRIEF DESCRIPTION OF THE DRAWINGS

The accompanying drawings, which are incorporated into and form a part of the specification, illustrate an embodiment of the invention and, together with the description, serve to explain the principles of the invention. In the drawings.

DETAILED DESCRIPTION OF THE INVENTION

Figure 1:
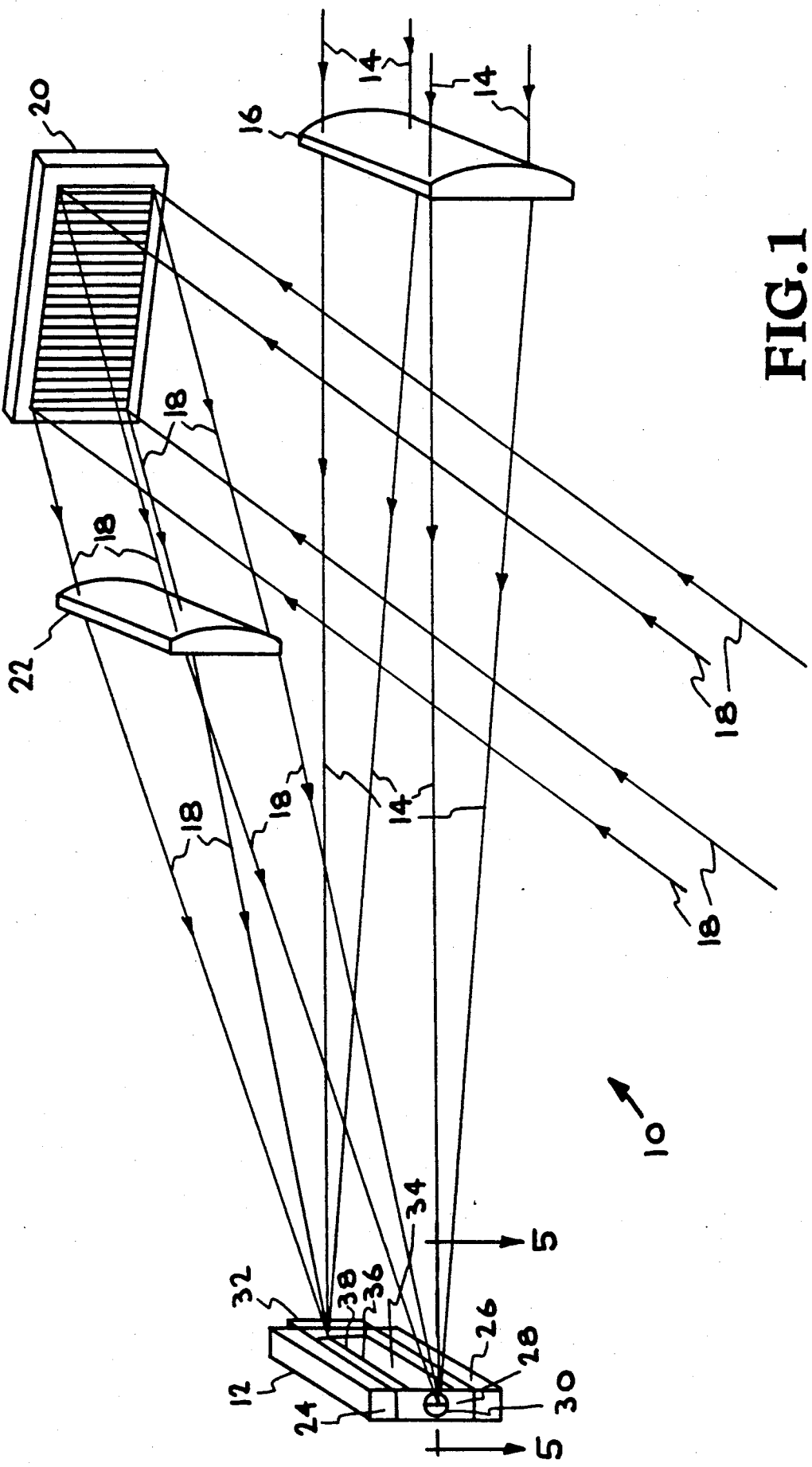
FIG. 1 is a schematic perspective view of an X-ray laser made in accordance with this invention.
Figure 2:
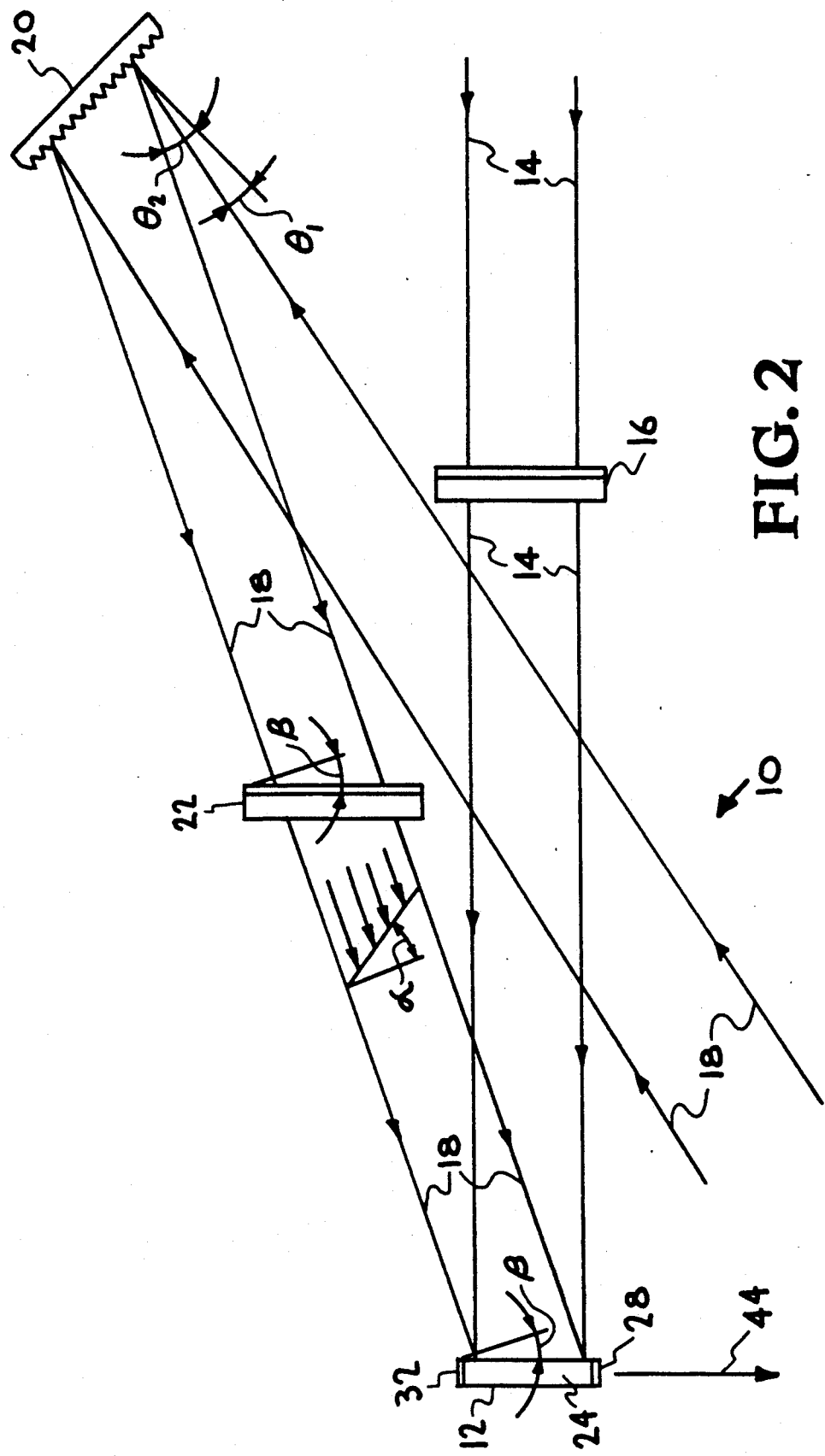
FIG. 2 is a top view of the X-ray laser of FIG. 1.

Reference will now be made in detail to the present preferred embodiment of the invention, an example of which is illustrated in the accompanying drawings. It is emphasized that while a single embodiment of a particular type of X-ray laser will be described, the inventive method and apparatus of this invention will operate effectively when used with virtually all collisional excitation schemes, such as those that are neon-like, nickel-like, or neodymium-like, for example, or to recombination X-ray laser schemes as well. This invention is thus certainly not limited to use with any particular scheme of X-ray laser physics. Reference is first made to FIGS. 1 and 2 which show a schematic perspective view and a top view, respectively, of an X-ray laser 10, made in accordance with this invention. A consistent set of reference numbers and symbols is used throughout the specification and drawings of this application. X-ray laser 10 comprises an X-ray laser target 12; a first optical laser radiation pulse 14; a first cylindrical lens 16 for line focusing the first optical laser pulse 14; a second optical laser radiation pulse 18; a diffraction grating 20; and, a second cylindrical lens 22 for line focusing the second optical laser pulse 18 after it has been diffracted from the diffraction grating 20.

The X-ray laser target 12 is shown comprised in part of a top frame member 24; a bottom frame member 26; a front spacer 28 having an aperture 30; and a back spacer 32. These components of target 12 are fairly representative of those known and used in the art, but are by no means necessary for the practice of this invention. As a critical component, the X-ray laser target 12 further comprises a flat thin foil 34. The flat thin foil 34 is often in practice mounted upon a support layer, not shown, but this is optional and definitely not necessary in the practice of this invention. Foil 34 is comprised of a material from which the X-ray gain medium of X-ray laser 10 is to be produced.

In operation, the first optical laser radiation pulse 14 and the first cylindrical lens 16 together comprise a means for illuminating a narrow and linear portion 36 of the flat thin foil 34 of the X-ray laser target 12 with optical laser radiation having scarcely enough energy to explode portion 36 and produce therefrom a narrow and linear cool plasma of uniform composition 38, coextensive with and slightly larger than portion 36, that exists for a time at least as long as the time that it takes light to travel the length of the narrow and linear cool plasma 38. When it is created, preferably, the narrow and linear cool plasma of uniform composition 38 will have an electron density within the range extending from approximately $3 \times 10^{20}$ to $3 \times 10^{21}$ electrons per centimeter cubed, and an electron temperature within the range extending from approximately 20 to 100 eV. In the presently preferred embodiment of this invention, the flat thin foil 34, while it could be efficaciously comprised of many other single elements, is comprised of tungsten and is approximately 500 Angstroms thick; the first optical laser radiation pulse 14 is configured as a temporally Gaussian shaped laser pulse having a full width at half maximum amplitude of approximately 1.0 nanosecond, is comprised of light having a wavelength of approximately 0.53 microns, and has an energy content of approximately merely 15 joules; and the narrow and linear portion 36 of foil 34 is approximately 50 microns wide and 1.5 centimeters long.

Figure 3:
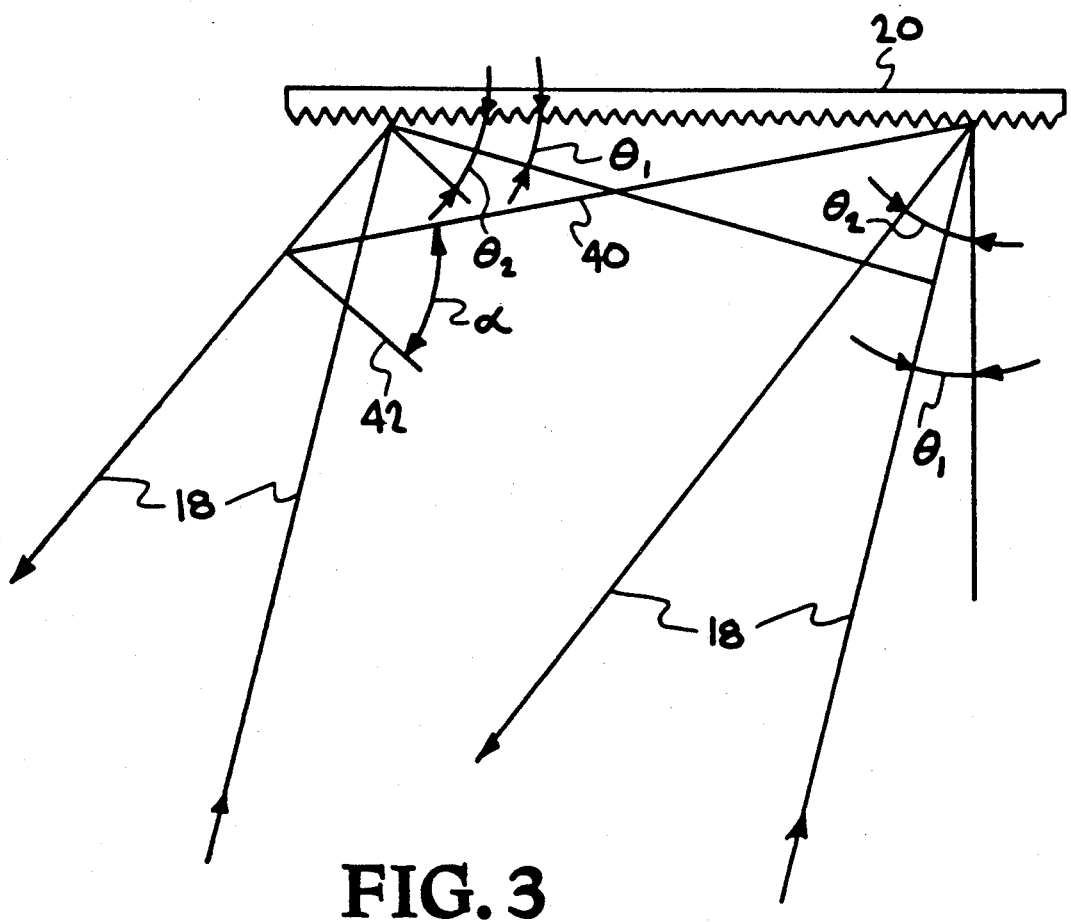
FIG. 3 is a top view of a diffraction grating of the X-ray laser of FIG. 1, showing the geometrical relationships relative thereto.

The second optical laser radiation pulse 18, the diffraction grating 20, which is shown as a reflection grating but in some beneficial situations may be transmissive, and the second cylindrical lens 22, together comprise a means for uniformly sweeping pulse 18 across the length, from end to end, of plasma 38, at approximately the speed of light, to consecutively illuminate continuously succeeding portions of plasma 38 with optical laser radiation having scarcely enough energy to heat, ionize, and invert the succeeding portions and convert them into the continuously succeeding portions of an X-ray gain medium having, preferably, a peak electron temperature within the range extending from approximately 1 to 2 KeV. Although shown in this particular manner, any other means of sweeping optical laser radiation across the length of a plasma is subsumed within the compass of this invention. In the presently preferred embodiment of this invention, both the flat thin foil 34 and the second cylindrical lens 22 are positioned with their surface normal directions at a tilt angle $\beta$ with respect to the direction of propagation of optical laser pulse 18, after it has been diffracted from diffraction grating 20. The tilt angle $\beta$ is shown in FIG. 2 and in FIG. 5, which is a top view of target 12 showing the geometrical relationships relative thereto. Since flat thin foil 34 and second cylindrical lens 22 are parallel, optical laser pulse 18 is line focused on the narrow and linear cool plasma of uniform composition 38. This discussion is now further extended to include reference to FIG. 3, which is a top view of the diffraction grating 20 and the second optical laser radiation pulse 18, and shows the geometrical relationships related thereto. It may be observed that pulse 18 is incident on grating 20 at an angle $\theta_1$ and that pulse 18 is diffracted from grating 20 at an angle $\theta_2$. It may be further observed, particularly in FIG. 3, that a beam front 40 of diffracted pulse 18 is inclined at an angle $\alpha$ with respect to a perpendicular 42 to the direction of propagation of diffracted pulse 18. This continuous spatial delay effect is well known and has been described by Bor et al, Appl. Phys. B 32, pages 101 to 104 (1983). The angles $\alpha$, $\beta$, $\theta_1$ and $\theta_2$ are all measured in the common parallel planes of FIGS. 2, 3 and 5. It may be shown from the geometry of FIG. 3 that $$\alpha = \tan^{-1}\left(\frac{\sin \theta_1 + \sin \theta_2}{\cos \theta_2}\right),$$

Figure 4:
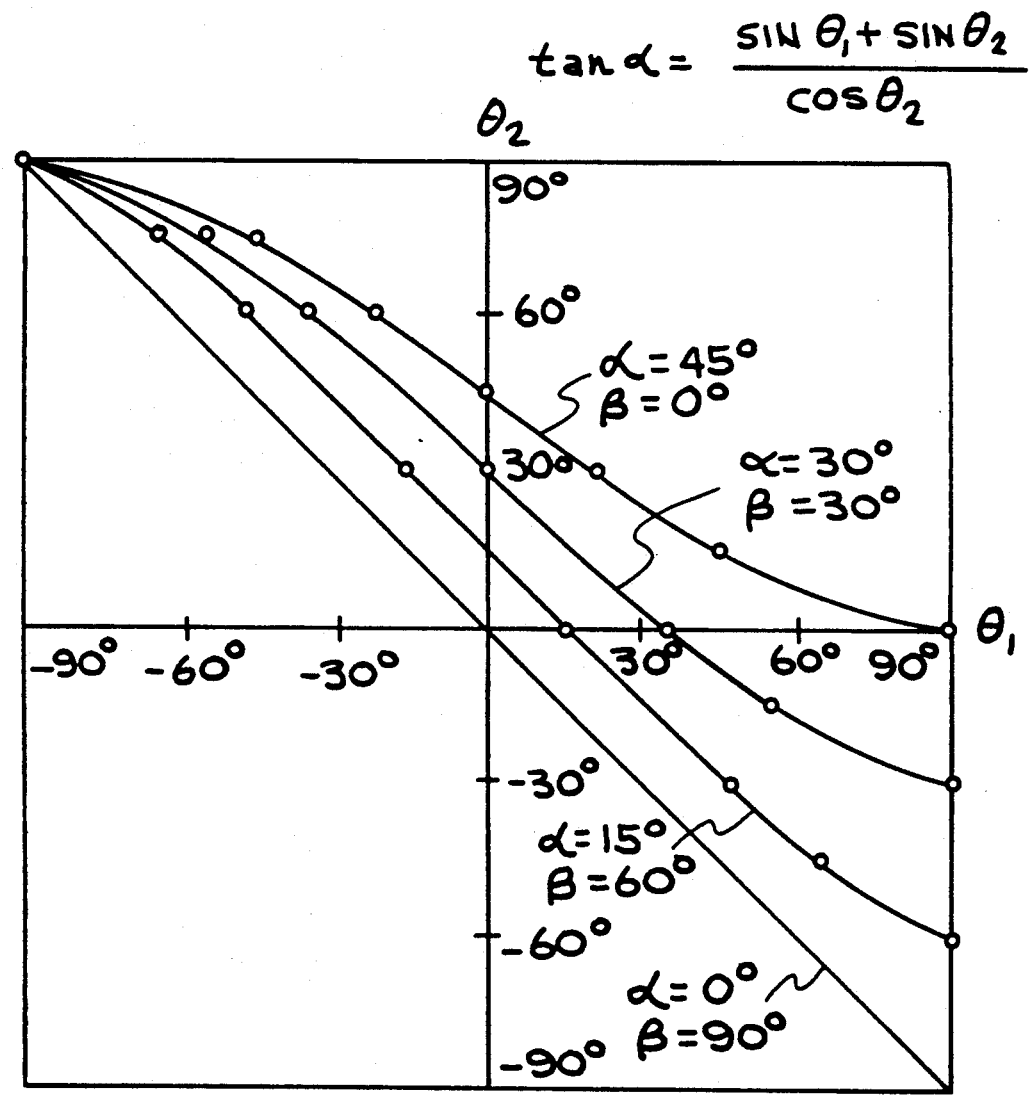
FIG. 4 is a graph illustrating the geometrical relationships relative to the diffraction grating of FIG. 3.

This relationship, with $\alpha$ taking the values 0 degrees, 15 degrees, 30 degrees, and 45 degrees, is illustrated in the graph of FIG. 4, to which reference is made. It is now to be observed from FIG. 5, that if beam front 40 of pulse 18 is to uniformly sweep across the flat thin foil 34 of target 12, and thus across cool plasma 38, from end to end at approximately the speed of light, it is required that $$\beta = \pi/2 - 2\alpha.$$

Figure 5:
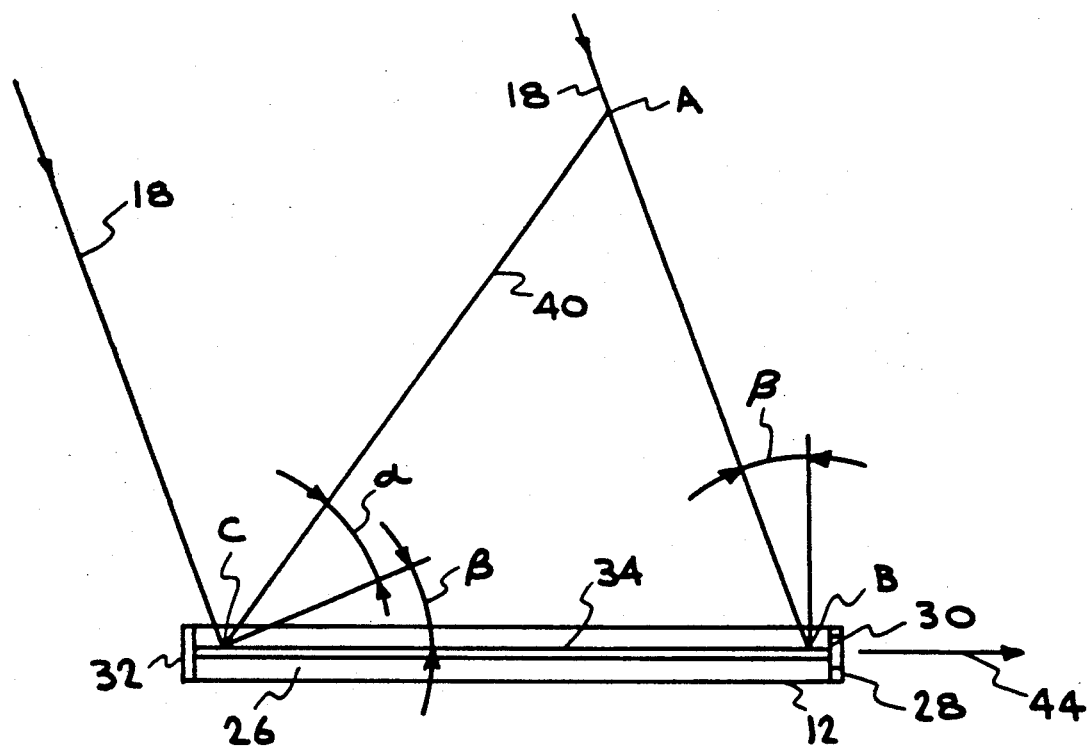
FIG. 5 is a top view of an X-ray laser target of the X-ray laser of FIG. 1, taken along the line 5—5 in FIG. 1, showing the geometrical relationships relative thereto.
Figure 6:
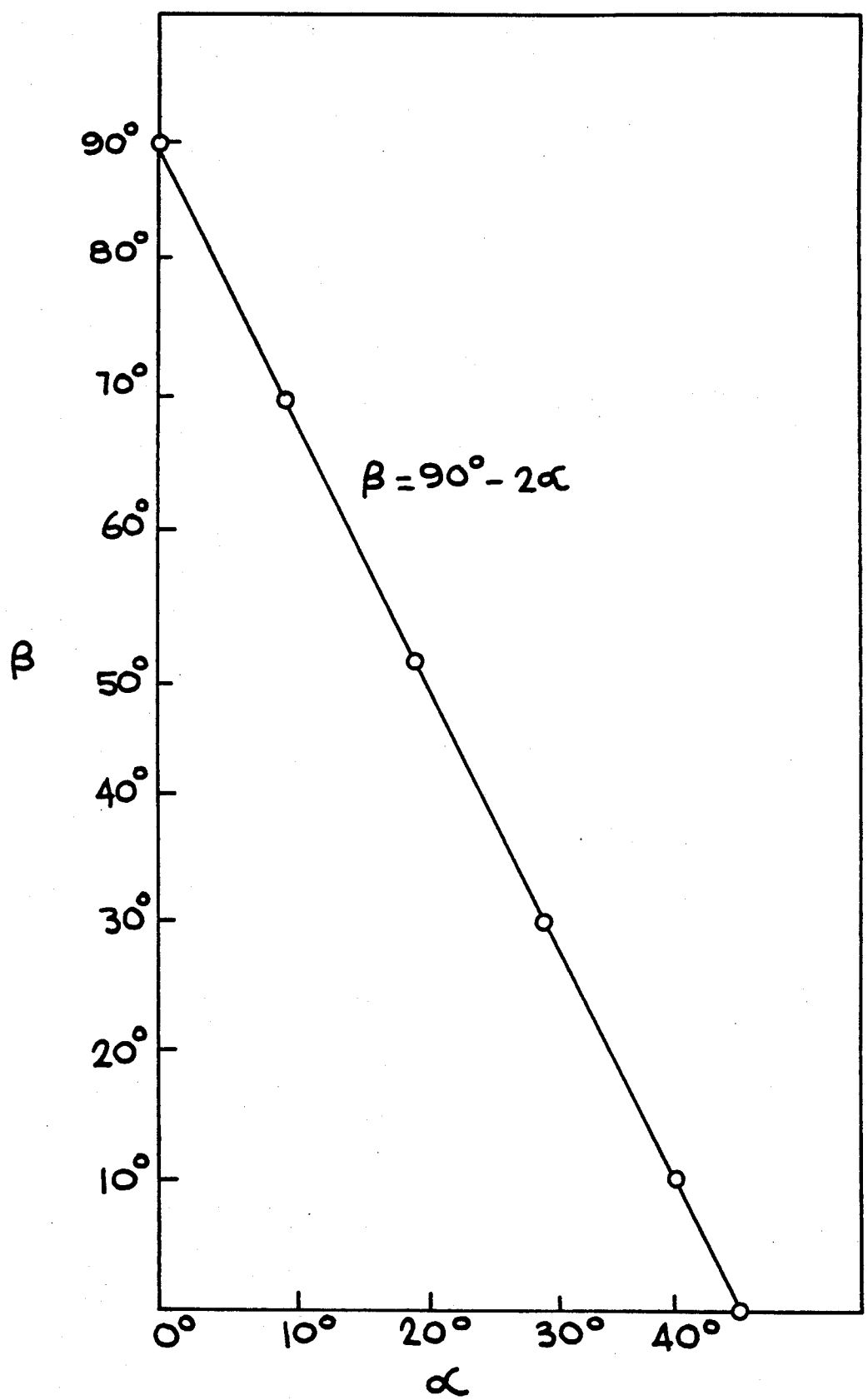
FIG. 6 is a graph illustrating the geometrical relationships relative to the X-ray laser target of FIG. 5.
Figure 7:
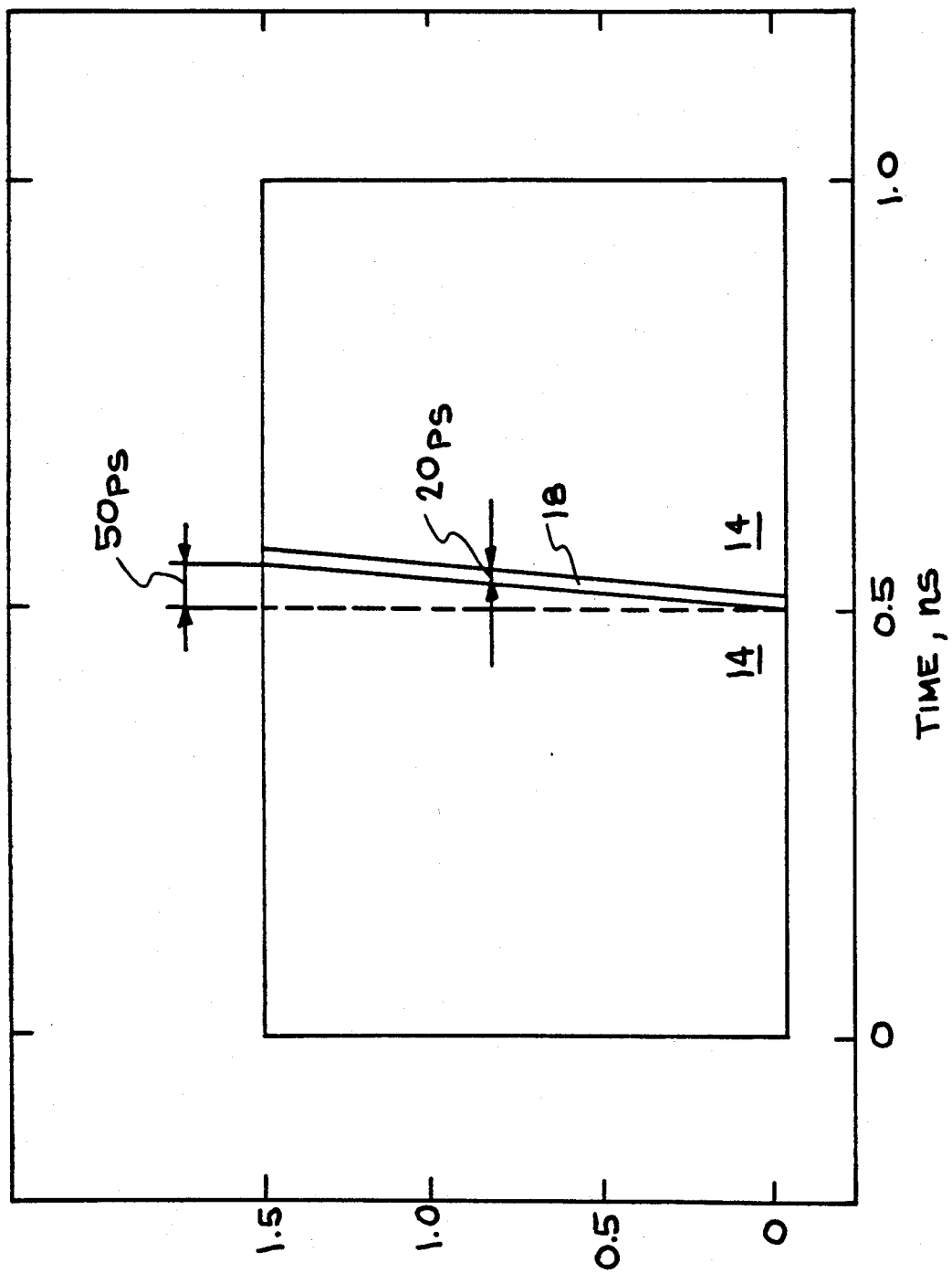
FIG. 7 is a graph of position versus time, illustrating the arrival of two optical laser driving pulses on the X-ray laser target of FIG. 5.

It is noted that the large triangle shown in FIG. 5, the corners of which are indicated by A, B and C, must be isosceles, with beam front 40 being the generally non-equal side of that triangle. This last relationship is illustrated in FIG. 6, to which references is made. This last relationship also makes it clear that when $\alpha$ takes on the values 0 degrees, 15 degrees, 30 degrees, and 45 degrees, $\beta$ must assume the values 90 degrees, 60 degrees, 30 degrees, and 0 degrees, respectively, as indicated on FIG. 4. It is particularly noted that if $\alpha$ is adjusted to 45 degrees, the tilt angle $\beta$ may be zero. This is an important and physically real situation. It is further noted that the case wherein $\alpha$ is zero and $\beta$ is 90 degrees, while illustrating the limiting case, is not representative of a physically viable situation. In the presently preferred embodiment of this invention, some parameters of which have been given above, it is further preferred that the second optical laser radiation pulse 18, before diffraction from grating 20, be configured as a temporally Gaussian shaped laser pulse having a full width at half maximum amplitude of about 20 picoseconds, be comprised of light having a wavelength of about 0.53 microns, and have an energy content of merely about 54 joules. It is similarly preferred that the diffracted pulse 18 be line focused by cylindrical lens 22 to a line width of about 30 microns upon the narrow and linear cool plasma of uniform composition 38, which is about 1.5 centimeters long. It is again emphasized that in other beneficial situations, optical laser radiation pulses 14 and 18 may collectively or individually have parameters that considerably vary from those stated herein; in particular, the wavelengths of pulses 14 and 18 may differ. In the preferred situation, FIG. 7, to which reference is now made, shows a graph of position along the foil 34 of target 12 versus time, and illustrates the arrival of driving optical laser radiation pulses 14 and 18 on foil 34. When so driven, X-ray laser 10 produces an X-ray laser pulse 44, as shown. The relative timing of pulses 14 and 18 is critical. For example, if pulse 18 is delayed by more than 0.5 nanoseconds in the situation shown, plasma 38 will tend to be of reduced density, and this could lead to reduced X-ray laser gain. X-ray laser pulse 44 is created as a traveling wave of amplified spontaneous emission as it propagates along plasma 38 in phase with the continuously succeeding portions of the X-ray gain medium produced therefrom by optical laser pulse 18.

Figure 8:
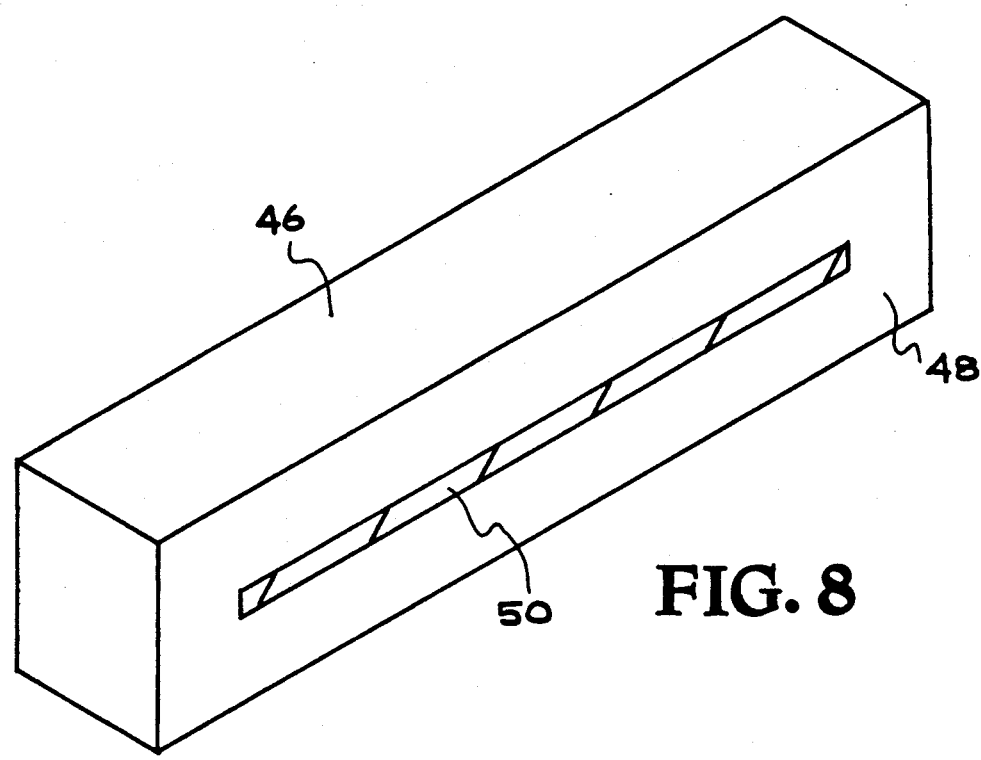
FIG. 8 is a perspective view of an alternative embodiment of an X-ray laser target, configured as a solid body having a flat surface, made in accordance with this invention.

Reference is now made to FIG. 8, which is a perspective view of another preferred X-ray laser target 46, having a flat surface 48, and a narrow and linear portion 50 of the flat surface 48. The target 46 is configured as a solid body. The utilization of target 46, in accordance with this invention, corresponds exactly with the general description given above with respect to target 12, and will therefore not be repeated herein.

Figure 9:
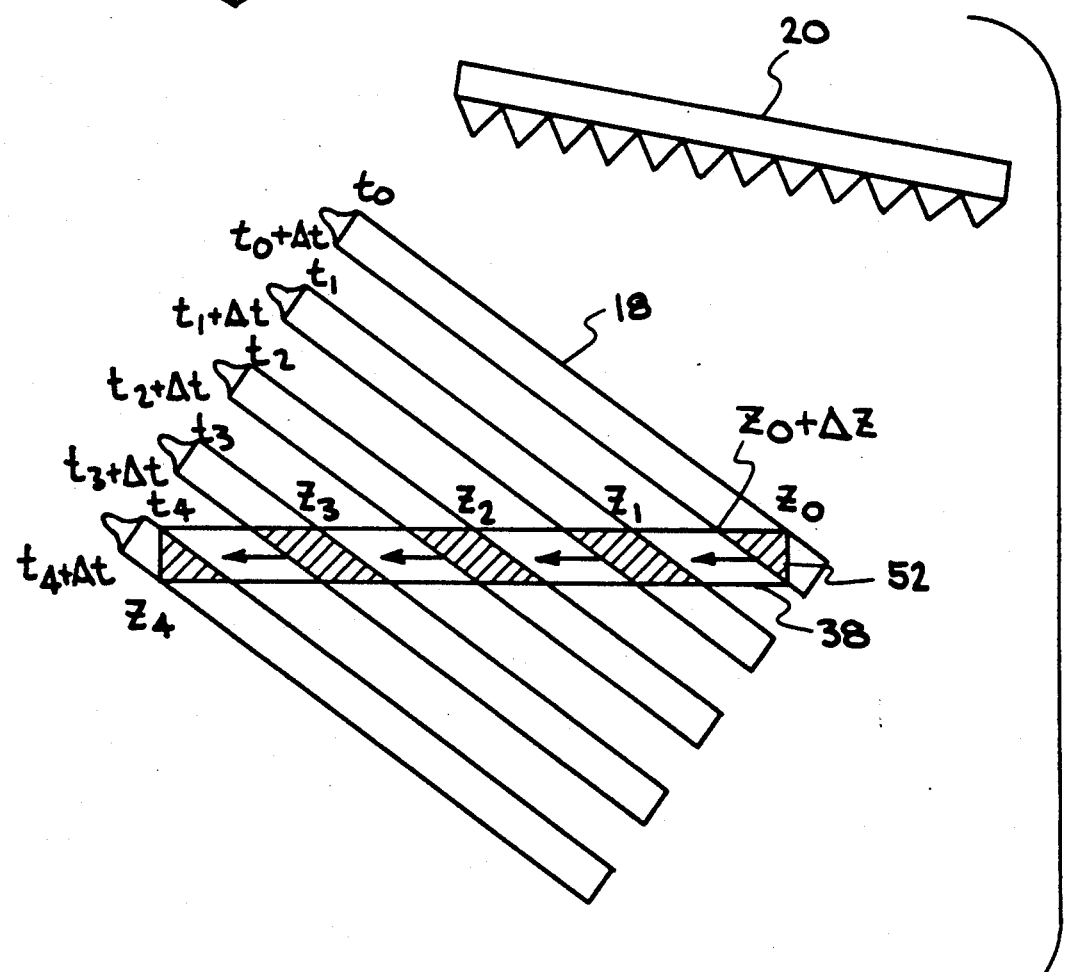
FIG. 9 is a schematic view of the sweeping of a short pulse of optical radiation along a cool plasma to produce continuously succeeding portions of x-ray gain medium.

The operation of the invention is further illustrated with reference to FIG. 9. As previously described, a cool plasma 38 (produced by the long first optical pulse 14) is swept by a short second optical laser radiation pulse 18 from diffraction grating 20 (lens 22 is omitted). As shown in FIG. 9, pulse 18 impinged on a position $z_0$ at one end of the plasma 38 at time $t_0$; impinged at intermediate positions $z_1$, $z_2$, $z_3$ at times $t_1$, $t_2$, $t_3$, respectively; and impinges at position $z_4$ at the distal end of plasma 38 at time $t_4$. The pulse 18 has a pulse width $\Delta t$ as shown in the temporal profile of the pulse impinging at the various positions at the designated times. The pulse 18 sweeps along the length of plasma 38 at the speed of light so that $z_4 - z_0 = c(t_4 - t_0)$. In the pulse width $\Delta t$, the pulse 18 will, therefore, have swept a distance $\Delta z = c \, \Delta t$. The pulse 18 inverts the cool plasma 38 to produce a section 52 of gain medium. As the pulse 18 sweeps along the length of the cool plasma 38, the section 52 of gain medium sweeps along the length. Although only a discrete number of points have been illustrated, the process is continuous, producing a continuously succeeding portion of x-ray gain medium through which the x-ray pulse propagates. Thus, only section 52 is inverted, at just the time when the x-ray laser pulse reaches section 52, to pump the x-ray laser with minimum energy requirements.

It is moreover in accordance with this invention, for example when the X-ray laser target, such as target 12, is comprised of a flat thin foil, such as foil 34, that both sides of the narrow and linear portion of the foil, such as portion 36, may be simultaneously driven by multiple sets of apparatuses exactly equivalent to the apparatus of FIGS. 1 and 2. In this way beam smoothing and improved uniformity of target illumination may be achieved. Further, such multiple sets of driving apparatus may be employed to simultaneously drive or illuminate all or individual parts of the narrow and linear portions of solid body X-ray laser targets, such as portion 50 of solid body target 46, again for purposes of beam smoothing and improved target illumination uniformity. In this second case all the driving optical laser pulses must impinge the solid target from the same side. Furthermore, in yet other situations, multiple simultaneous first optical laser pulses, such as pulse 14, but only a single second optical laser pulse, such as pulse 18, or vice versa, may be advantageously employed. In short, either the first or the second driving quantity of optical laser radiation required for carrying out this invention, or both, may be provided by multiple optical laser pulses. These multiple pulses will individually be of reduced energy, and be provided by optical lasers of reduced size.

In the presently preferred embodiment of this invention, only a total of about 69 joules of optical laser beam energy are required. Using the conventional single pulse approach, would require about 9,000 joules of driving optical laser radiation. Thus the double pulse technique of this invention results in a saving of more than two orders of magnitude in driving optical laser energy. It is thus appreciated that in accordance with the invention as herein described and shown in FIGS. 1 to 8, X-ray lasers and methodology for their operation, that utilize low energy optical laser driving means of small physical size, are provided.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, in some situations a narrow and linear cool plasma of uniform composition, corresponding to plasma 38, could be produced by capillary discharge, thus obviating the requirement of a first optical laser radiation pulse and a first cylindrical lens, such as pulse 14 and lens 16, as described above. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An X-ray laser in which X-ray radiation is amplified along a path disposed within an X-ray gain medium, the X-ray laser comprising:
   a target comprised of a material from which the X-ray gain medium is to be produced;
   means for illuminating a narrow and linear portion of the target with a first quantity of optical laser radiation, that has scarcely enough energy to explode the portion and produce therefrom a narrow and linear cool plasma of uniform composition; and
   means for uniformly sweeping a second quantity of optical laser radiation across the length, from end to end, of the narrow and linear cool plasma of uniform composition, at approximately the speed of light, to consecutively illuminate continuously succeeding portions of the cool plasma with optical laser radiation having scarcely enough energy to heat, ionize, and invert each succeeding portion of the cool plasma, and thereby convert it into a continuously succeeding portion of the X-ray gain medium.

2. An X-ray laser as recited in claim 1, wherein the target is configured as a flat thin foil; wherein the illuminating means comprises means for line focusing the first quantity of optical laser radiation on a narrow and linear portion of the flat thin foil; and, wherein the uniformly sweeping means comprises a diffraction grating for diffracting the second quantity of optical laser radiation to provide a diffracted beam of optical laser radiation, means for positioning the flat thin foil with its surface normal at a tilt angle with respect to the direction of propagation of the diffracted beam of optical laser radiation, and means for line focusing the diffracted beam of optical laser radiation on the narrow and linear cool plasma of uniform composition.

3. An X-ray laser as recited in claim 2, wherein the second quantity of optical laser radiation is incident on the diffraction grating at an angle $\theta_1$; wherein the diffracted beam of optical laser radiation is diffracted from the diffraction grating at an angle $\theta_2$; wherein the beam front of the diffracted beam of optical laser radiation is inclined at an angle $\alpha$ with respect to the perpendicular to the direction of propagation of the diffracted beam of optical laser radiation; wherein $\alpha$ is provided by the relationship $$\alpha = \tan^{-1}\left(\frac{\sin \theta_1 + \sin \theta_2}{\cos \theta_2}\right);$$

wherein the tilt angle is $\beta$; and wherein $\beta$ is provided by the relationship $$\beta = \pi/2 - 2\alpha.$$

4. An X-ray laser as recited in claim 3, wherein the narrow and linear cool plasma of uniform composition has an electron density within the range extending from approximately $3 \times 10^{20}$ to $3 \times 10^{21}$ electrons per centimeter cubed, and an electron temperature within the range extending from approximately 20 to 100 eV; and, wherein each continuously succeeding portion of the X-ray gain medium is heated to a peak electron temperature within the range extending from approximately 1 to 2 KeV.

5. An X-ray laser as recited in claim 4, wherein the flat thin foil is comprised of tungsten and is approximately 500 Angstroms thick; wherein the first quantity of optical laser radiation is configured as a temporally Gaussian shaped laser pulse having a full width at half maximum amplitude of approximately 1.0 nanosecond, is comprised of light having a wavelength of approximately 0.53 microns, and has an energy content of approximately 15 joules; wherein the second quantity of optical laser radiation, before being diffracted from the diffraction grating, is configured as a temporally Gaussian shaped laser pulse having a full width at half maximum amplitude of approximately 20 picoseconds, is comprised of light having a wavelength of approximately 0.53 microns, and has an energy content of approximately 54 joules; wherein the narrow and linear portion of the flat thin foil upon which the first quantity of optical laser radiation is line focused is approximately 50 microns wide and 1.5 centimeters long; and, wherein the diffracted beam of optical laser radiation is line focused by the line focusing means to an area approximately 30 microns wide and 1.5 centimeters long upon the narrow and linear cool plasma of uniform composition.

6. An X-ray laser as recited in claim 1, wherein the target is configured as a solid having a flat surface; wherein the illuminating means comprises means for line focusing the first quantity of optical laser radiation on a narrow and linear portion of the flat surface of the target; and, wherein the uniformly sweeping means comprises a diffraction grating for diffracting the second quantity of optical laser radiation to provide a diffracted beam of optical laser radiation, means for positioning the target with its surface normal at a tilt angle with respect to the direction of propagation of the diffracted beam of optical laser radiation, and means for line focusing the diffracted beam of optical laser radiation on the narrow and linear cool plasma of uniform composition.

7. An X-ray laser as recited in claim 6, wherein the second quantity of optical laser radiation is incident on the diffraction grating at an angle $\theta_1$; wherein the diffracted beam of optical laser radiation is diffracted from the diffraction grating at an angle $\theta_2$; wherein the beam front of the diffracted beam of optical laser radiation is inclined at an angle $\alpha$ with respect to the perpendicular to the direction of propagation of the diffracted beam of optical laser radiation; wherein $\alpha$ is provided by the relationship $$\alpha = \tan^{-1}\left(\frac{\sin\theta_1 + \sin\theta_2}{\cos\theta_2}\right);$$

wherein the tilt angle is $\beta$; and wherein $\beta$ is provided by the relationship $$\beta = \pi/2 - 2\alpha.$$

8. An X-ray laser as recited in claim 1, wherein the first quantity of optical laser radiation is comprised of a multiplicity of optical laser beams.

9. An X-ray laser as recited in claim 1, wherein the second quantity of optical laser radiation is comprised of a multiplicity of optical laser beams.

10. An X-ray laser as recited in claim 1, wherein the first quantity of optical laser radiation is comprised of a first multiplicity of optical laser beams, and wherein the second quantity of optical laser radiation is comprised of a second multiplicity of optical laser beams.

11. A method for providing an X-ray gain medium that laser amplifies X-ray radiation along a path within the gain medium, the method comprising the steps of:
illuminating a narrow and linear portion of a target, comprised of a material from which the X-ray gain medium is to be produced, with a first quantity of optical laser radiation having scarcely enough energy to explode the portion and produce therefrom a narrow and linear cool plasma of uniform composition; and uniformly sweeping, at approximately the speed of light, a second quantity of optical laser radiation across the length from end to end of the narrow and linear cool plasma of uniform composition, thereby consecutively illuminating continuously succeeding portions of the cool plasma with optical laser radiation having scarcely enough energy to heat, ionize, and invert each succeeding portion of the cool plasma and convert it into a continuously succeeding portion of said X-ray gain medium.

12. A method for providing an X-ray gain medium, as recited in claim 11, wherein the illuminating step comprises the step of line focusing the first quantity of optical laser radiation on a narrow and linear portion of a flat thin foil that comprises the target; and, wherein the uniformly sweeping step comprises the steps of diffracting the second quantity of optical laser radiation from a diffraction grating to provide a diffracted beam of optical laser radiation, positioning the flat thin foil with its surface normal at a tilt angle with respect to the direction of propagation of the diffracted beam of optical laser radiation, and line focusing the diffracted beam of optical laser radiation on the narrow and linear cool plasma of uniform composition.

13. A method for providing an X-ray gain medium, as recited in claim 12, wherein the diffracting step comprises setting the angle of incidence of the second quantity of optical laser radiation on the diffraction grating at $\theta_1$, and the angle at which the diffracted beam of optical laser radiation is diffracted from the diffraction grating at $\theta_2$, so that the beam front of the diffracted beam of optical laser radiation is inclined at an angle $\alpha$ with respect to the perpendicular to the direction of propagation of the diffracted beam of optical laser radiation, with $$\alpha = \tan^{-1}\left(\frac{\sin\theta_1 + \sin\theta_2}{\cos\theta_2}\right);$$

and, wherein the positioning step comprises setting the tilt angle at $\beta$, with $$\beta = \pi/2 - 2\alpha.$$

14. A method for providing an X-ray gain medium, as recited in claim 11, wherein the illuminating step comprises the step of line focusing the first quantity of optical laser radiation on a narrow and linear portion of a flat surface of a solid body that comprises the target; and, wherein the uniformly sweeping step comprises the steps of diffracting the second quantity of optical laser radiation from a diffraction grating to provide a diffracted beam of optical laser radiation, positioning the target with its surface normal at a tilt angle with respect to the direction of propagation of the diffracted beam of optical laser radiation, and line focusing the diffracted beam of optical laser radiation on the narrow and linear cool plasma of uniform composition.

15. A method for providing an X-ray gain medium, as recited in claim 14, wherein the diffracting step comprises setting the angle of incidence of the second quantity of optical laser radiation on the diffraction grating at $\theta_1$, and the angle at which the diffracted beam of optical laser radiation is diffracted from the diffraction grating at $\theta_2$, so that the beam front of the diffracted beam of optical laser radiation is inclined at an angle $\alpha$ with respect to the perpendicular to the direction of propagation of the diffracted beam of optical laser radiation, with $$\alpha = \tan^{-1}\left(\frac{\sin\theta_1 + \sin\theta_2}{\cos\theta_2}\right);$$

and, wherein the positioning step comprises setting the tilt angle at $\beta$, with $$\beta = \pi/2 - 2\alpha.$$

* * * * *